(12) United States Patent
Montemagno et al.

(10) Patent No.: US 9,359,230 B2
(45) Date of Patent: *Jun. 7, 2016

(54) NANOFABRICATED MEMBRANE USING POLYMERIZED PROTEOLIPOSOMES

(75) Inventors: Carlo Montemagno, Glendale, OH (US); Chandrasmitha Bhatt, Soenderborg (DK); Jinsoo Yi, Soenderborg (DK); Theiss Stenstroem, Soenderborg (DK)

(73) Assignee: Applied Biomimetic A/S, Nordborg (DK)

( * ) Notice: Subject to any disclaimer, the term of this patent is extended or adjusted under 35 U.S.C. 154(b) by 1083 days.

This patent is subject to a terminal disclaimer.

(21) Appl. No.: 13/147,628

(22) PCT Filed: Feb. 3, 2010

(86) PCT No.: PCT/US2010/023043
§ 371 (c)(1),
(2), (4) Date: Oct. 18, 2011

(87) PCT Pub. No.: WO2010/091078
PCT Pub. Date: Aug. 12, 2010

(65) Prior Publication Data
US 2012/0043275 A1 Feb. 23, 2012

Related U.S. Application Data

(60) Provisional application No. 61/149,521, filed on Feb. 3, 2009.

(51) Int. Cl.
*C02F 1/44* (2006.01)
*B01D 69/10* (2006.01)
(Continued)

(52) U.S. Cl.
CPC . *C02F 1/44* (2013.01); *B01D 69/10* (2013.01);
*B01D 69/142* (2013.01); *B01D 71/06* (2013.01); *B01D 71/56* (2013.01); *B01D 2323/30* (2013.01); *C02F 2103/08* (2013.01)

(58) Field of Classification Search
None
See application file for complete search history.

(56) References Cited

U.S. PATENT DOCUMENTS 4,348,329 A * 9/1982 Chapman ............ 554/80
4,931,498 A * 6/1990 Pidgeon ............ 525/54.1
(Continued)

FOREIGN PATENT DOCUMENTS

JP 6-234626 8/1994
WO WO 89/08130 9/1989
(Continued)

OTHER PUBLICATIONS

Liu, et al., "Hierarchical self-assembling of dendritic-linear diblock complex based on hydrogen bonding", Polymer, Elsevier Science Publishers B.V., GB, 3759-3770, vol. 48, No. 13, Jun. 5, 2007.

(Continued)

*Primary Examiner* — Krishnan S Menon
(74) *Attorney, Agent, or Firm* — Yancy IP Law, PLLC

(57) ABSTRACT

The present invention generally related to a nanofabricated membrane including polymerized proteoliposomes. The nanofabricated membrane is a bio-nano fused selective membrane using protein-incorporated uv-crosslinkable liposomes with a chemical reactive biocompatible interstitial matrix. In the present invention, internally UV-crosslinked protein-incorporated proteolipsomes are used because the proteoliposomes made by natural lipids have a short life time and a weak resistance to the circumstantial stresses such as a high and low temperature, pressure, ionic strength etc. Furthermore, the proteo-vesicles made by amphiphilic block copolymers provide less consistency in accomplishing proper functionality batch to batch because of the inevitable polydiversity of the polymer.

7 Claims, 4 Drawing Sheets

(51) Int. Cl.
*B01D 71/06* (2006.01)
*B01D 71/56* (2006.01)
*B01D 69/14* (2006.01)
*C02F 103/08* (2006.01)

(56) References Cited

U.S. PATENT DOCUMENTS

| | | | |
|---|---|---|---|
| 5,288,517 | A | 2/1994 | Kanno |
| 6,887,507 | B2 | 5/2005 | Nomoto |
| 7,208,089 | B2 | 4/2007 | Montemagno |
| 2001/0034432 | A1 | 10/2001 | Sodroski |
| 2002/0155152 | A1* | 10/2002 | Nomoto et al. ............... 424/450 |
| 2004/0049230 | A1 | 3/2004 | Montemagno |
| 2004/0242770 | A1 | 12/2004 | Feldstein |
| 2006/0183166 | A1 | 8/2006 | Mayer |
| 2007/0087328 | A1 | 4/2007 | Sieytr |
| 2008/0317840 | A1 | 12/2008 | Lee |
| 2011/0259815 | A1 | 10/2011 | Montemagno |

FOREIGN PATENT DOCUMENTS

| | | |
|---|---|---|
| WO | WO 97/31625 | 9/1997 |
| WO | 2004/101447 | 11/2004 |
| WO | 2006/122566 | 11/2006 |
| WO | WO 2007/127439 | 11/2007 |

OTHER PUBLICATIONS

Nardin, et al., "Hybrid Materials from amphiphilic block copolymers and membrane proteins", Reviews in Molecular Biotechnology, Elsevier, Amsterdam, NL, vol. 90, 17-26, No. 1, Mar. 1, 2002.

Ho, et al., "Block Copolymer-based Biomembranes Functionalized with Energy Transduction Proteins", Biological and Bioinspired Materials and Devices, Apr. 13-16, 2004, Mat. Res. Soc, Symp. Proc., vol. 823, 2004, pp. 187-192.

Soong, et al., "Powering an Inorganic Nanodevice with a Biomolecular Motor", Science, vol. 290, pp. 1555-1558, Nov. 24, 2000.

Cooper, et al., "Adsorption of Frog Foam Nest Proteins at the Air-Water Interface", Biophysical Journal, vol. 88, p. 2114-2125, Mar. 2005.

Mackenzie et al., "Ranasupumin-2: Structure and Function of a Surfactant Protein from the Foam Nests of a Tropical Frog", Biophysical Journal, vol. 96, p. 4984-4992, Jun. 2009.

Nikolov et al., "Ordered Micelle Structuring in Thin Films Formed from Anionic Surfactant Solutions", Journal of Colloid and Interface Science, vol. 133, No. 1, Nov. 1989.

Niewiadomski et al., "Dispersed Oil Impact on Froth Stability in Flotation", Physicochemical Problems of Mineral Processing, vol. 35, p. 5-19, 2001.

Koch, et al., "Incorporation of ATP Synthetase Into Long-Term Stable Liposomes of a Polymerizable Synthetic Sulfolipid", FEBS Letters, Sep. 1981, vol. 132, No. 2, pp. 313-318.

* cited by examiner

NANOFABRICATED MEMBRANE USING POLYMERIZED PROTEOLIPOSOMES

BACKGROUND OF THE INVENTION

This invention is a nanofabricated membrane including polymerized proteoliposomes. In one embodiment of the present invention, the membrane is a protein-incorporated water selective membrane.

In a conventional reverse osmosis membrane as provided in U.S. Pat. No. 6,878,278, there is a polyamide surface on a porous membrane employing Schotten-Baumann reaction with multifunctional amine monomer and polyfunctional acyl halide monomer. However, some chemicals such as trimesoyl chloride (TMC) destroy protein functionality because the chemicals have a highly hydrolysing property. That means it is difficult, if not impossible, to in situ incorporate a protein-incorporated polymerized liposomes into the polyamide matrix which is necessary for filling external spaces of the proteolipsomes.

BRIEF SUMMARY OF THE INVENTION

The present invention generally related to a nanofabricated membrane including polymerized proteoliposomes. The nanofabricated membrane is a bio-nano fused selective membrane using protein-incorporated uv-crosslinkable liposomes with a chemical reactive biocompatible interstitial matrix. In the present invention, internally UV-crosslinked protein-incorporated proteolipsomes are used because the proteoliposomes made by natural lipids have a short life time and a weak resistance to the circumstantial stresses such as a high and low temperature, pressure, ionic strength etc. Furthermore, the proteo-vesicles made by amphiphilic block copolymers provide less consistency in accomplishing proper functionality batch to batch because of the inevitable polydiversity of the polymer.

The synthesized and UV mediated polymerizable liposomes have UV-crosslinkable chemical structure in the hydrophobic area and higher consistency to make proteoliposomes than amphiphilic triblock copolymer. Additionally, the polymerized proteoliposomes have a strong mechanical resistance to the physical stress. Moreover, the chemical structure of the hydrophilic region of the lipid monomer may be modified to connect to an interstitial matrix or modify the surface of support or base membranes through various induced covalent bonds.

In one embodiment of the present invention, the present invention seeks to accomplish the following: 1) lipid incorporation into a conventional polyamide surface and 2) a biocompatible polyamide matrix for in situ proteoliposome incorporation using homobifuntional poly ethylene glycol (PEG) crosslinker or amine-dendrimers 3) lipid incorporation into a amine group modified cellulose nanomembrane, mixed cellulose ester nanomembrane, glass surface, and amine modified silicon or any possible materials that can be modified by amine groups.

In one embodiment of the present invention, the incorporated protein is a member of the Aquaporin family of proteins. However, it should be understood that the present invention is not limited to only this family of proteins. The resulting membrane has a water bypass through Aquaporin mediated water selective transportation and hollow space in the polymerized proteoliposomes in the biocompatibly reconstituted interstitial matrix. This membrane is capable of showing high water selectivity, water permeability, and low energy requirement owing to the Aquaporin functionality.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

Figure 1:
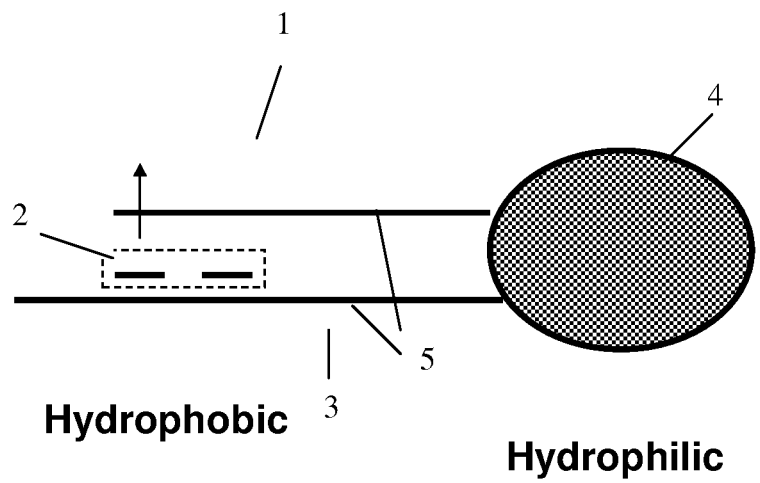
FIG. 1 shows an enlarged view of the liposome wall wherein a UV-crosslinkable functional group is present in the hydrophobic part of the lipid monomer.
Figure 2:
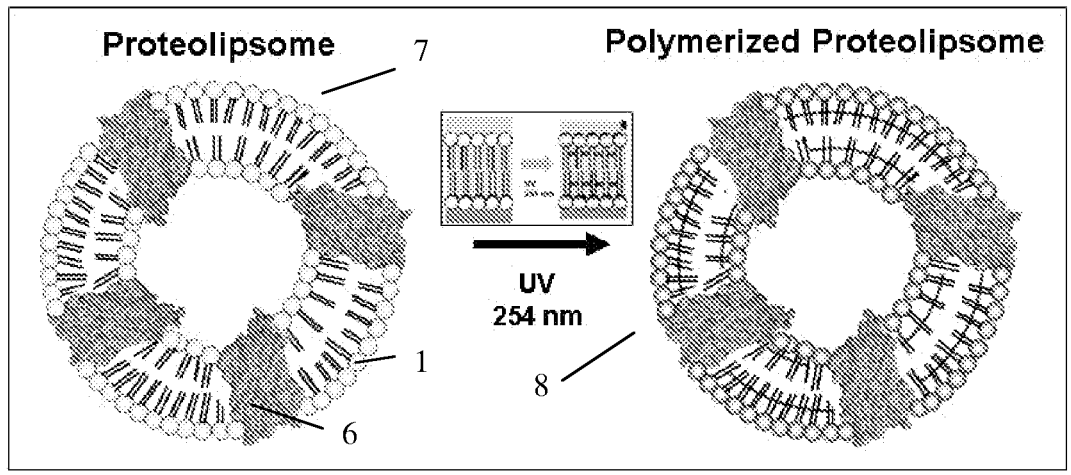
FIG. 2 shows a process for reconstructing the polymerized proteoliposome by UV exposure in accordance with one embodiment of the present invention.

In order to obtain a nanofabricated membrane in accordance with the present invention, polymerized proteoliposomes are first formed by incorporating proteins (6) into UV-crosslinkable liposomes (1). The UV-crosslinkable liposomes (1) are synthetic using material that mimic the structure of natural lipids. As shown in FIG. 1, the UV-crosslinkable liposomes (1) (for example 1-palmitoyl-2-(10Z,12Z-tricosdiynoyl)-sn-glycero-3-phosphocholine, 1-palmitoyl-2-(10Z,12Z-tricosdiynoyl)-sn-glycero-3-phosphoethanolamine, 1,2-di-(10Z,12Z-tricosdiynoyl)-sn-glycero-3-phosphocholine, 1-2-(10Z,12Z-tricosdiynoyl)-sn-glycero-3-phosphoethanolamine) have UV-crosslinkable chemical structure (2) in the hydrophobic area (3); 10,12-pentacosadiynoic acid (PCDA) and its functional derivatives of hydrophilic part (fluorescent diacetylene monomers). It is understood that the UV-crosslinkable chemical structure may be included in one or both of the hydrophobic tails (5). The UV-crosslinkable liposome also comprises a hydrophilic area (4). In one embodiment, the UV-crosslinkable chemical structure (2) may include diacethylene for internal crosslinking. However, the present invention should not be limited to this specific UV-crosslinkable chemical structure (2) as those of ordinary skill in the art could select additional UV-crosslinkable chemical structures (2) without departing from the scope of the present invention. FIG. 1 shows one embodiment of the present invention having a schematic structure of 1-Palmitoyl-2-(10Z,12Z tricosadiynoyl)-sn-glycero-3-phosphoethanolamine (Diyne PE) as the hydrophobic area (3). This internal UV-crosslinking provides a liposome that has strong mechanical resistance to physical stress. After the UV-crosslinkable liposomes (1) are formed the protein (6) is incorporated into the wall of the liposomes using known techniques. In one embodiment of the present invention, Aquaporins are used as the proteins (6) to be incorporated. However, it is understood that other proteins (6) may be incorporated into the UV-crosslinkable liposomes (1) as known to those of skill in the art. Once the protein (6) is incorporated into the UV-crosslinkable liposome (1), the proteoliposome is polymerized using UV exposure to form the polymerized proteoliposome (7). FIG. 2 shows the proteoliposome (7) prior to UV crosslinking. After the proteoliposome is exposed to UV radiation, the polymerized proteoliposome (8) is formed by UV-crosslinkable functional groups (2) in the hydrophobic part (3) of the liposome (1).

Figure 3:
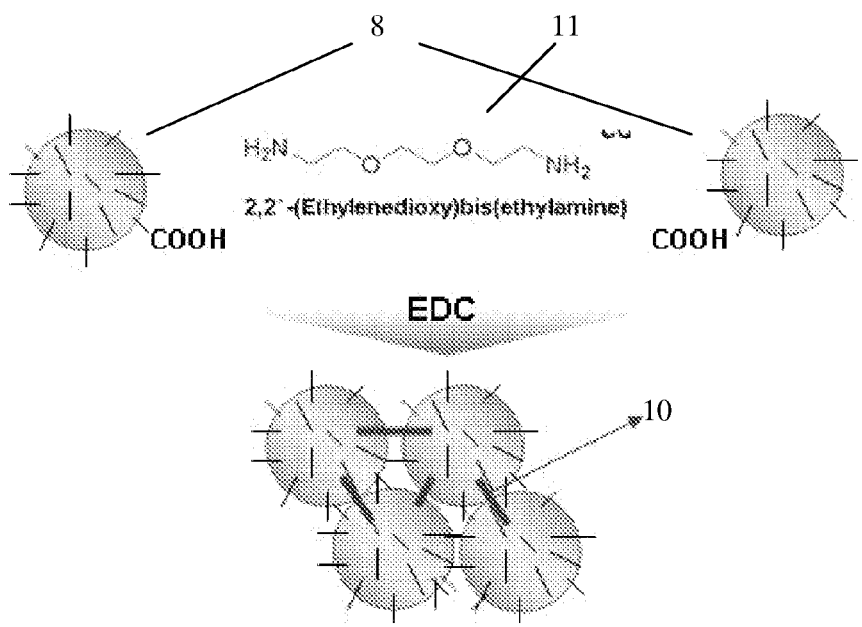
FIG. 3 shows the chemical crosslinking between vesicles in accordance with one example embodiment of the present invention.
Figure 4:
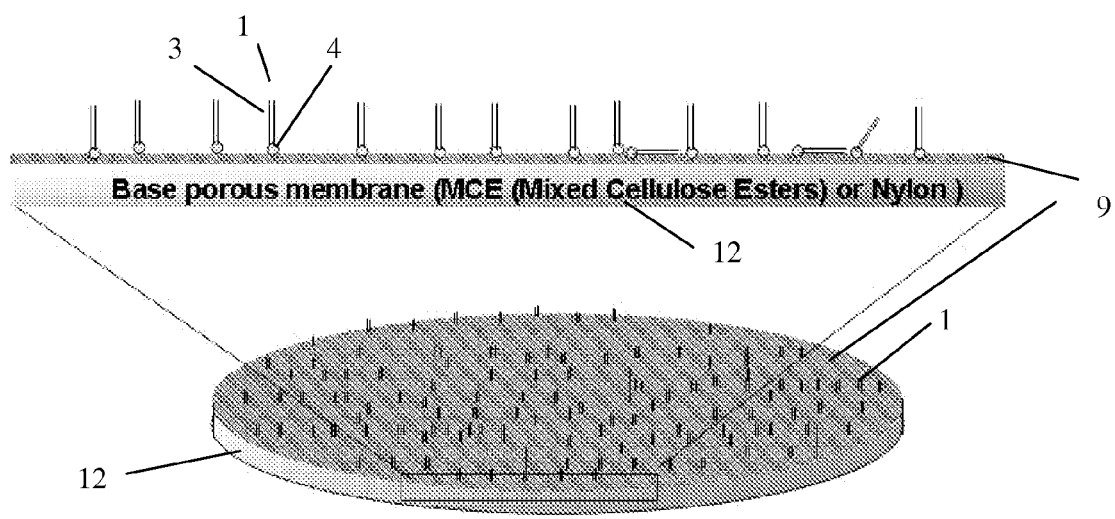
FIG. 4 shows an amine containing phospholipid (e.g. ethanolamine phospholipid) with a hydrophilic part (head group) for surface modification of a thin polyamide layer on the MCE (mixed cellulose ester) and Nylon base membrane in accordance with one embodiment of the present invention.
Figure 5:
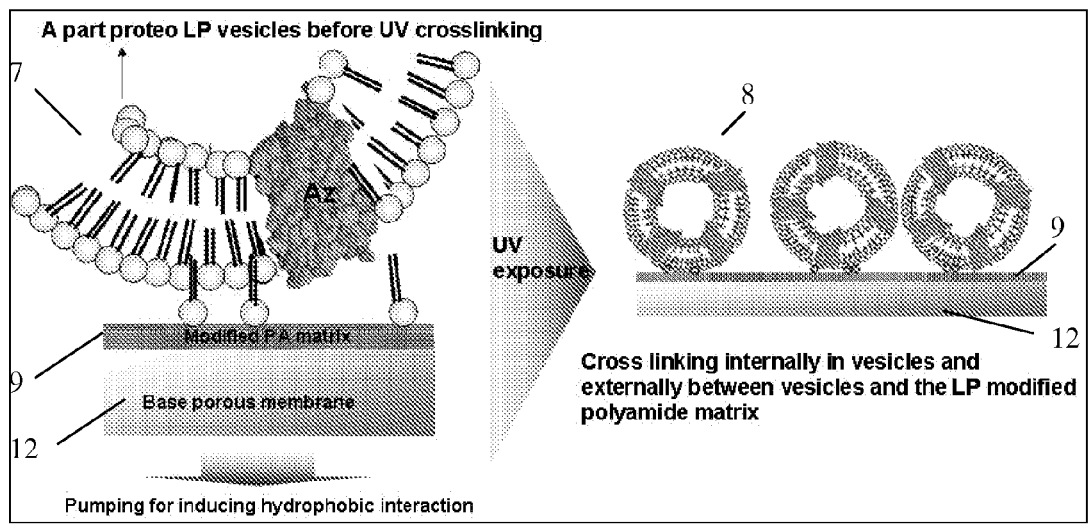
FIG. 5 shows the lipid incorporated base membrane to connect the polymerized proteolipsomes on the covalent bond matrix on top of the base membrane in accordance with one embodiment of the present invention.

As shown in FIG. 3, the head group, or hydrophilic region, (4), of the polymerized proteoliposomes (8) are chemical modified to increase connectivity through external crosslinking between proteoliposomes or proteoliposomes and interstitial matrix. The hydrophilic area (4) of the synthesized lipids may include various multifunctional amines, carboxylates and phosphates. The head groups may be modified using hetero functional crosslinkers for example, N-Hydroxysuccinimide ester (NHS ester)—Biotin or imidoester-Biotin can be used for biotinlyation. The modification is performed by covalent crosslinking using various kinds of chemical conjugates (11) including, but not limited to, photoreactive crosslinkers, zero-length crosslinkers, homobifunctional crosslinkers, heterobifunctional crosslinkers, trifunctional crosslinkers, dendrimers and other known chemical conjugation methods. In the zero-length crosslink for amide linkage, carbodiimides may be used. In one embodiment of the present invention, EDC (1-ethyl-3-(3-dimethylamineopropyl)carbodiimide hydrochloride is used as the crosslinking agent. However, other carbodiimides may be used without departing from the scope of the present invention. The amine groups of the 2,2' (Ethylenedioxy)bis(ethylamine) are useful for covalent crosslinking of carboxylate or phosphate groups of the proteoliposomes, through EDC activation. The polymerized proteoliposomes are highly resistant to solvents and other reaction. Therefore, the polymerized proteoliposome itself could be used for a good linker between polymerizable proteoliposomes and polyamide thin layer likewise in the structure between myosin and actin filaments. FIG. 4 shows amine phospholipid (e.g. ethanolamine phospholipid) containing hydrophilic parts (4) for surface modification of the thin polyamide layer on an MCE (mixed cellulose ester) and Nylon base membrane (12). To plant the liposomes (1) in the polyamide thin layer, amine-containing natural lipids and UV-crosslinkable lipids can be used. One or more amine sources are used to form a polyamide matrix that includes hydrophobic parts (3) that face up on the matrix. FIG. 5 shows the proteoliposomes (7) prior to UV exposure and the final UV-crosslinked polymerized proteoliposomes (8) including internal and external crosslinking (9) of the liposomes (1) and the liposome modified polyamide matrix (12).

Figure 6:
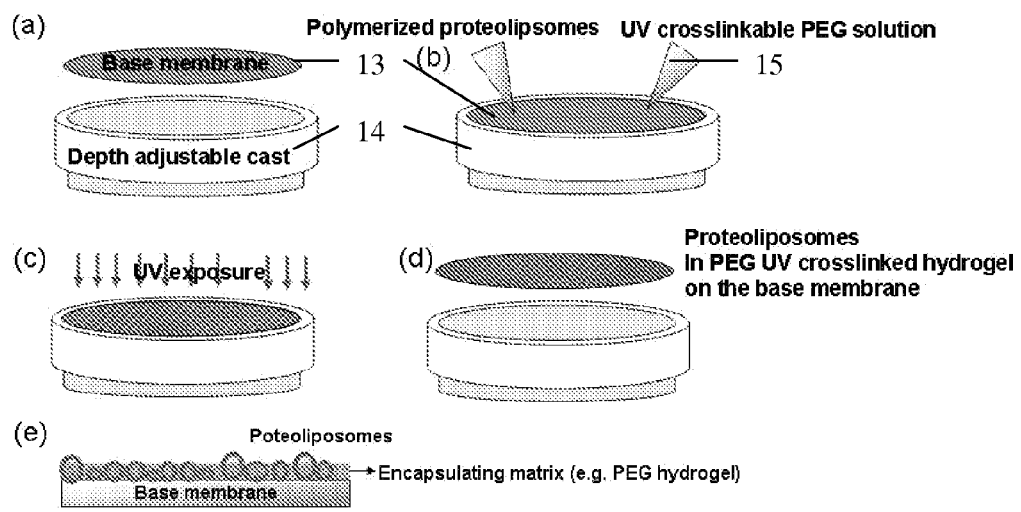
FIG. 6 shows in situ embedding polymerized proteolipsomes with uv-crosslinkable amine-PEG hydrogel, biocompatible interstitial matrix wherein: (a) a base membrane is provided in the depth adjustable cast; (b) polymerized proteoliposomes and uv-crosslinkable PEG solutions were doped on the base membranes, if needed EDC mediated crosslinking between amine-PEG and phosphated lipids may be performed; (c) UV curing for membrane hardening; (d) detaching the fabricated membrane from the cast and (e) schematics of cross-section of the in situ embedded membrane in accordance with one embodiment of the present invention. The base membrane will be activated with amine groups or acrylic acids to induce the crosslinking with liposomes and hydrogel. Inkjet printing technology would be used to the in situ embedded membranes.

To encapsulate the polymerized proteoliposomes (8) in the matrix, the proteoliposomes (7) are incorporated with the matrix on the base membrane (12) simultaneously. This process is referred to herein as "in situ incorporation". FIG. 6 shows the fabrication process of hydrogel-proteoliposomes. The process includes the following steps: (a) a base membrane (13) is provided in the depth adjustable cast (14); (b) polymerized proteoliposomes (8) and uv-crosslinkable PEG solutions were doped (15) on the base membranes (13), if needed EDC mediated crosslinking between amine-PEG and phosphated lipids may be performed and polymerized proteoliposomes activated with NHS-acrylic acid can be used for connecting uv-crosslinkable PEG; (c) UV curing for membrane hardening; and (d) detaching the fabricated membrane from the cast. FIG. 6(e) shows a schematic of the cross-section of the in situ embedded membrane in accordance with one embodiment of the present invention.

Figure 7:
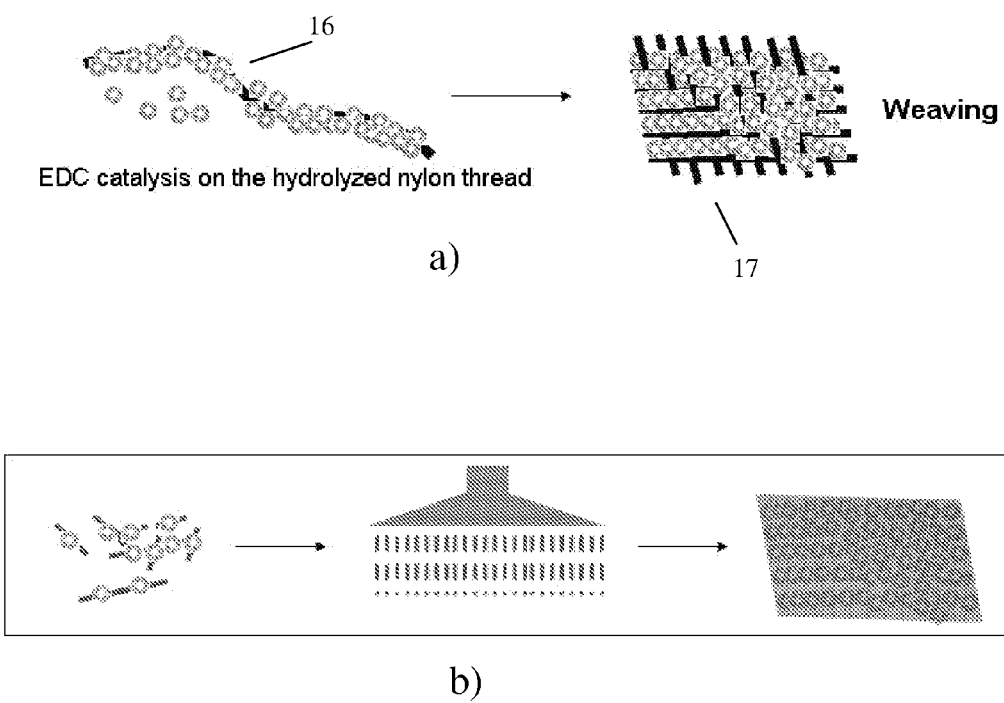
FIG. 7 shows a base membrane free desalination filter fabrication with (a) polymerized proteoliposomes coated threads for the weaving method and (b) water resistant fibrous structure between polymerized proteoliposomes with the non-woven method.

For further application of the polymerized proteoliposome technology, polymerized proteoliposome coated hydrolyzed nylon threads may be formed as shown in FIG. 7. The hydrolyzed nylon thread (16) includes carboxyl and amine groups on its surface for covalent crosslinking with the polymerized proteoliposomes. FIG. 7 shows a desalination filter fabrication that is free from a base membrane with (a) polymerized proteoliposomes coated threads (16) for a weaving method (17) and (b) water resistant fibrous structure between polymerized proteoliposomes with a non-woven method for example by exposing them to UV-crosslinking light.

In another aspect of the invention, polymerized proteoliposomes including the Aquaporin family of proteins incorporated into the liposome wall may be formed into the membranes, including woven structures and non-woven structures, provided above that result in stable films that will only pass water, thus facilitating water purification, desalinization, and molecular concentration through dialysis. The aquaporins exclude the passage of all contaminants, including bacteria, viruses, minerals, proteins, DNA, salts, detergents, dissolved gases, and even protons from an aqueous solution, but aquaporin molecules are able to transport water because of their structure. Water moves through the membrane in a particular direction because of hydraulic or osmotic pressure. Water purification/desalinization can be achieved with a two-chambered device separated by a rigid membrane at its center that is filled with aquaporins. The membrane itself is impermeable to water and separates contaminated water from purified water in the chamber. Only pure water is able to flow between the two chambers. Thus, when sea water or other contaminated water on one side of the membrane is placed under an appropriate pressure, pure water naturally flows into the other chamber. Accordingly, purified water can be obtained from undrinkable sources or, if the source water contained chemicals of interest, the water can be selectively removed, leaving a high concentration of the wanted chemicals in the input chamber.

Importantly, however, the aquaporins are also suited to this invention for reasons other than their exclusive selectivity for water. Many members of this protein family (such as AquaporinZ (AqpZ) are extremely rugged and can withstand the harsh conditions of contaminated source water without losing function. AqpZ resists denaturing or unraveling from exposure to acids, voltages, detergents, and heat. Therefore, the device can be used to purify source water contaminated with materials that might foul or destroy another membrane, and it can be used in areas that experience consistently high temperatures. AqpZ is also mutable. Since this protein is specifically expressed in host bacteria according to a genetic sequence that influences its final shape and function, a technician can easily change its genetic code in order to change the protein's characteristics. Therefore the protein can be engineered to fulfill a desired application that may be different from the protein's original function. For example, by simply changing a particular amino acid residue near the center of the water channel to cysteine, the Aquaporins produced would bind any free Mercury in the solution and cease transporting water due to the blockage. Thus, these mutant proteins used in a membrane device could detect Mercury contamination in a water sample by simply ceasing flow when the concentration of the toxic substance rises too high.

Thus, there has been disclosed methods and apparatus utilizing biological components to achieve the highly efficient production of completely pure water from fouled, salty, or otherwise contaminated water. The invention demonstrates the integration of water transporting biological proteins with an external device, and points the way toward a manufacturing pathway capable of large-scale production of water purification devices.

The contents of U.S. Pat. No. 7,208,089, entitled "Biomimetic membranes", is expressly incorporated herein by reference. The International patent application, PCT/US08/74163, entitled "Biomimetic Polymer Membrane that Prevents Ion Leakage", is expressly incorporated herein by reference. The International Patent application, PCT/US08/74165, entitled "Making Functional Protein-Incorporated Polymersomes", is expressly incorporated herein by reference. The U.S. Provisional application 61/055,207, entitled "Protein Self-Producing Artificial Cell, is expressly incorporated herein by reference.

Example

The following is an example of one embodiment of the present invention. It is understood that various modifications of this Example may be performed without departing from the scope of the invention.

1. Polymerized Proteoliposomes

The UV reactive polymerizable lipids that have uv-crossliking chemical groups (for example, polyacetylene) in the hydrophobic area (for example, 16:0-23:2 Diyne PC—Avanti cat#790146 or 23:2 Diyne PC—Avaanti cat#870016 or 10-12-pentacosadiynoic acid, polydiacetylene etc.) were dissolved in the chloroform or t-butanol with the concentration of 5 mg/ml. The thin film can be made in 2 ways:

a. The dissolved lipid solution was transferred in the glass vacuum flask that was completely dried. To form the thin film inside the glassware, the solution was dried with gently shaking under the heavy gas (Argon or Nitrogen gas) jet. To remove the solvents completely, the dried thin film was purged over 4 hours or more.

b. A solution of the dissolved lipid in t-butanol in a round bottom flask was attached to a rotary vapour and the solvent was removed under reduced pressure at ~40° C. to 70° C. The film is dried for about 60 minutes or longer to effect complete drying. The film can be used immediately or stored under an inert atmosphere at −80° C.

Subsequently, the buffer-Aquaporin mixture (the required concentration of buffer (100 mM MOPS-Na, pH 7.5 or 20 mM PBS pH 7.5) detergent (octyl glucoside, triton X-100, dodecyl maltoside etc.) and protein) was added in the thin film formed glassware. Continuously, the mixture with thin film was sonicated under the heavy gas jet until the solution becomes transparent. After that the solution was dialyzed against the assay buffer (50 mM MOPS-Na, 150 mM N-Methyl-D-Glucamine, 1 mM Sodium Azide, pH 7.5 or 20 mM PBS buffer, pH 7.5) for 2 days changing fresh buffer at least 3 times. After dialysis, the dialyzed solution was diluted two times with assay buffer and filtered with 0.22 um of the disposable syringe filter. The functionality of Aquaporin incorporated proteoliposomes was measured before UV polymerization with stop flow light scattering (SFLS). Until this step, whole process should be accomplished in the dark room. To calculate the permeability of the proteoliposomes, dynamic light scattering (DLS) is necessary to measure the size of the liposomes.

To make polymerized proteoliposomes, the proteoliposomes were polymerized with 254 nm wavelength of UV exposure for 10 minutes.

2. Modification of the Head Group of the Lipid Monomers to Increase Connectivity Through External Crosslinking Between Proteoliposomes or Proteoliposomes and Interstitial Matrix.

To construct the covalent chemical crosslinking, various kinds of chemical conjugations were used such as photoreactive crosslinkers, zero-length crosslinkers, homobifunctional crosslinkers, heterobifunctional crosslinkes, trifunctional crosslinkers, tetrafunctional crosslinkers, dendrimers and so on. In the photoreactive crosslinkers, there are acrylic acid derivates and acryl azide derivates such as NHS-acrylic acid and NHS-ASA (NHS-4-azidosalicylic acid), and bis-[(β-(4-azidosalicylamido)ethyl]disulfide (BASED). In the zero-length crosslinks for amide linkages, there are carbodiimides such as EDC (1-ethyl-3-(3-dimethylamineopropyl)carbodiimide hydrochloride, EDC with Sulfo-NHS(N-hydroxysulfosuccinimide), CMS (1-chclohexyl-3-(2-morpholinoethyl) carbodiimide), DCC (dicyclohexyl carbodiimide), DIC (diisopropyl carbodiimide), Woodward's reagent K (N-ethyl-3-phenylisoxazolium-3'-sulfonate), CDI (N,N'-carbonyldiimidazole). In conventional protein conjugation methods, EDC is a biocompatible mediator for making the peptide bond (amide bond). For this reaction, the amine group is necessary for the covalent crosslink (peptide bond) through EDC activated carboxylate groups or phosphate groups. In the homofunctional crosslinkers, there are homofunctional NHS esters; dithiobis(succinimidylpropinate) (DSP), 3,3'-dithiobis(sulfosuccinimidylpropionate) (DTSSP), disuccinimidyl suberate (DSS), bis(sulfosuccinimidyl)suberate ($BS^3$), disuccinimidyl tartarate (DST), disulfosuccinimidyl tartarate (sulfo-DST), bis[2-(succinimidyloxycarbonyloxy) ethyl]sulfone BSOCOES, bis[2-(sulfosuccinimidyloxycarbonyloxy)ethyl]sulfone (sulfo-BSOCOES), Ethylene glycolbis(succinimidylsuccinate) (EGS), Ethylene glycolbis (sulfosuccinimidylsuccinate) (sulfo-EGS), dicuccinimidyl gluarate (DSG), N,N'-disuccinimidyl carbonate (DSC), and bisNHS(PEG)n. And homofuncitonal imidoesters such as dimethyl adipimidate (DMA), dimethyl pimelimidate (DMP), dimethyl suberimidate (DMS), dimethyl 3,3-dithobispropionimidate (DTBP). In the heterofuncitonal crosslinkers, there are NHS-hydrazine moiet (SANH), NHS-adldyde moiet (SFB) etc. In the trifunctional crosslinkers, there are 4-azido-2-nitrophenylbiocytin-4-nitrophenyl ester (ABNP), sulfosuccinimidyl-2-[6-(biotinamido)-2-(p-azidobenzamido)hexanoamido]ethyl-1,39-dithopropinate (sulfo SBED).

In the tetrafuntional crosslinker, there are avidin, streptavidin, and neutravidin which can react with 4 biotins.

Various multifunctional amines, biotins, carboxylates, and phosphates can be added in the hydrophilic area of the synthesized lipids. Additionally, the photoreactive crosslinkers such as acrylic acids, diacethylene, methacrylate are used for inducing the membrane hardening through crosslinking between polymerized proteoliposomes or interstitial matrix.

3. Lipid Incorporation into Polyamide Matrix

The polymerized proteoliposomes are highly resistant to dissolving solvent and other reaction. Therefore, it was determined that the UV-crosslinkable lipid (or liposome, in the following just examplified to as the liped) itself could be used for a good linker between polymerizable proteoliposomes and polyamide thin layer likewise in the structure between myosin and actin filaments. To plant the UV-crosslinkable lipid in the polyamide thin layer, we used ethanolamine included natural lipids and UV-crosslinkable lipid. The ethanolamine group was used as one more amine source to form the polyamide matrix expecting hydrophobic part to face up on the matrix. To do this process, MCE (mixed cellulose ester) and Nylon porous membranes (other membranes such as durapore and isopore membranes could also be used) were soaked in the lipid solvent solution. Subsequently, the solvent was evaporated and incubated in the diamine chemicals such as m-phenylenediamine or any other polyfunctional amine. After removing and drying excess amount of amine source, it was treated with a polyfunctional acylhalide such as trimesoyl chloride (TMC) (or any other acyl derivatives that can form an amide bond) that is dissolved in a non-polar organic solvent like hexane. The reaction is finished in several seconds and the excess amount of TMC was washed in the deionized water completely. A structure as shown in FIG. 4 was expected. Water droplet contact angle observations indicated that the hydrophobicity is increased as would be expected if the hydrophilic parts of the liposomes. After this reaction, we figured out increasing the hydrophobicity of the lipid included matrix is increased. This means hydrophilic area is facing up as expected.

4. In Situ Incorporation into Biocompatible Matrix Such as Peg Included Hydrogel or Amine Dendrimers For the in situ incorporation of the polymerized proteoliposomes in the interstitial matrix, some biocompatible materials are necessary. Poly ethylene glycol (PEG) and amine-dendrimers are good candidates for the purpose.

Poly ethylene glycol (PEG) has been used for conjugating biomolecules due to its water solubility and biocompatibility. PEG is a kind of polymer that shows low polydiversity and has capability to incorporate reactive groups such as UV-crosslinkable reagents, metal chelating agents, fluorescence, ligands, etc. In addition, carboxylate group can be attached in the PEG to be able to lead the EDC mediated biocompatible crosslinking reaction with amine groups. The PEG polymer is able to form a hydrogel through attaching the methacrylate UV-crosslinkable chemical. This PEG hydrogel approach was used in hardening lipid planar membrane in previous study. In this example, carboxylated or amine attached PEG hydrogel were used as a nanosized crosslinking spacer between the polymerized proteoliposomes.

In addition, the cellulose included support membranes can be activated by 3-amiopropyltriethoxysilane (APTES) which can provide primary amine functional group for in situ crosslinking with various kinds of amine mediated crosslinkers. Moreover, the UV-crosslinking groups can be used with that. The FIG. 6 shows the fabrication process of hydrogel-proteoliposomes. The polymerized proteoliposomes solution and UV-crosslinkable PEG hydrogel solution are water-based solutions. The solutions are mixed together and doped on the base membrane in the depth adjustable mould. After curing with UV, a highly compacted and hardened membrane is formed.

Dendrimers are usually used as multivalent bioconjugating scaffolds that are preconstructed by ethylenediamine (EDA) and emthylacrylate. The size of dendrimers can be regulated in the nanometer level by synthetic stage that is G-0 (1.4 nm, 3 amine surface groups)~G-4 (4.4 nm, 48 amine surface groups). Those dendrimers have multifunctional amine attached structure and are able to be used as a biocompatible interstitial matrix through crosslinking phosphated or carboxylated groups in the hydrophilic area (head group) of the UV-crosslinkable liposomes through the EDC mediated amide bond formation.

In addition, another non-toxic process to the protein using poly-L-lysine that is a natural heterobifunctional amine with SMCC can be used to make amide bond with amine groups with EDC mediated reaction. The matrix from both materials is well known as the bio-compatible material that can make a soft cushion to immobilize the polymerized proteoliposomes.

5. Fabrication for the Base Membrane Free Reverse Osmosis Membranes.

For the further application of the polymerized proteoliposome technology, polymerized proteoliposome coated hydrolysed nylon threads can be produced. The hydrolyzed nylon thread in high temperature (80° C.) includes carboxyl groups and amine groups on its surface. Likewise previous mentioned zero length conjugating methods; the polymerized proteoliposomes can be covalently crosslinked on the activated thread with EDC mediated amide bond formation as shown in FIG. 7(a). Or cellulose treads that are activated by APTES and interacted with amine crosslinkers may be used.

In addition, it was reported that high density polyethylene may be formed using non-woven fibrous sample with $CO_2$ spraying (*Ind. Eng. Chem. Res.,* 1997, 36 (5), pp 1586-1597). The polymerized proteoliposomes of the present invention may be used with these high density polyethylene materials because the polymerized proteoliposomes has high resistance to the outside circumstance.

Although the present invention has been disclosed in terms of a preferred embodiment, it will be understood that numerous additional modifications and variations could be made thereto without departing from the scope of the invention.

The invention claimed is:

1. A membrane including liposomes supported by a base porous membrane, said liposomes having proteins incorporated into their walls wherein said liposomes are internally UV-crosslinked and wherein there is external cross-linking between liposomes or between the liposomes and an interstitial matrix or a support, said external cross-linking being via the hydrophilic region of the liposomes.

2. The membrane of claim 1, wherein the liposomes comprise lipids having two hydrophobic tails and the internal UV-crosslinks are included in one or both of the hydrophobic tails.

3. The membrane of claim 1, wherein the base membrane comprises a mixed cellulose ester, cellulose, and/or polyamide.

4. The membrane according to claim 1, wherein proteins of the Aquaporin family of proteins are incorporated into the liposome, the membrane being a water filtration membrane.

5. A membrane according to claim 1, in which the base membrane comprises a thin polyamide layer.

6. The membrane of claim 1, in which there is external cross-linking between liposomes.

7. The membrane of claim 5, wherein the liposomes are linked to the polyamide thin layer.

* * * * *